US012518306B2

(12) United States Patent
Loomis

(10) Patent No.: US 12,518,306 B2
(45) Date of Patent: *Jan. 6, 2026

(54) PROTOTYPE MESSAGE SERVICE

(71) Applicant: VISA INTERNATIONAL SERVICE ASSOCIATION, San Francisco, CA (US)

(72) Inventor: Gregory Loomis, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 18/365,706

(22) Filed: Aug. 4, 2023

(65) Prior Publication Data

US 2023/0385891 A1 Nov. 30, 2023

Related U.S. Application Data

(63) Continuation of application No. 16/702,139, filed on Dec. 3, 2019, now Pat. No. 11,763,362.

(51) Int. Cl.
*G06Q 30/0601* (2023.01)
*G06Q 20/40* (2012.01)

(52) U.S. Cl.
CPC ......... *G06Q 30/0609* (2013.01); *G06Q 20/40* (2013.01)

(58) Field of Classification Search
CPC .. G06Q 30/0609; G06Q 20/40; G06Q 20/401; G06Q 20/405
See application file for complete search history.

(56) References Cited

U.S. PATENT DOCUMENTS

| 6,647,376 | B1 * | 11/2003 | Farrar | G06Q 20/04 |
| | | | | 705/45 |
| 7,131,108 | B1 | 10/2006 | Tang et al. | |
| 10,002,348 | B1 * | 6/2018 | Doctor | G06Q 20/401 |
| 10,096,007 | B2 | 10/2018 | Nordlof et al. | |
| 2002/0097715 | A1 * | 7/2002 | Roerick | G06Q 40/02 |
| | | | | 370/389 |

(Continued)

FOREIGN PATENT DOCUMENTS

| EP | 0835488 B1 * | 9/2003 | ........... G06F 9/4881 |
| WO | 0205226 A1 | 1/2002 | |

(Continued)

OTHER PUBLICATIONS

HIF Interface, ISO-8583 Message Format (1987) (Year: 1987).*

(Continued)

*Primary Examiner* — James H Miller
(74) *Attorney, Agent, or Firm* — Kilpatrick Townsend & Stockton LLP

(57) ABSTRACT

Described herein are systems and techniques in which a service provider may determine one or more capabilities of an authorization provider. To do this, the service provider may, upon receiving a request to determine authorization provider capabilities that includes at least an account identifier and an indication of a transaction type, identify a prototype message template associated with the indicated transaction type from a plurality of prototype transaction templates. The service provider may then overwrite a number of default data values with data values specific to the transaction to generate a prototype message for the transaction, which it may then send to the authorization provider. Upon receiving a response from the authorization provider, the service provider may determine whether the authorization provider is capable of conducting a transaction of the indicated transaction type based on information included within the received response.

20 Claims, 6 Drawing Sheets

(56) References Cited

U.S. PATENT DOCUMENTS

| | | |
|---|---|---|
| 2006/0041840 A1 | 2/2006 | Blair et al. |
| 2006/0050684 A1* | 3/2006 | Bangham ............ G06Q 20/4016 370/352 |
| 2007/0124210 A1 | 5/2007 | Chiappetti et al. |
| 2009/0294526 A1 | 12/2009 | Maw |
| 2012/0131445 A1* | 5/2012 | Oyarzabal ............. G06F 40/103 715/235 |
| 2013/0254110 A1* | 9/2013 | Royyuru .............. G06Q 20/356 705/44 |
| 2014/0149315 A1* | 5/2014 | Evenhouse ............ G06Q 40/06 709/217 |
| 2016/0034900 A1* | 2/2016 | Nelsen .................. G06F 21/31 705/44 |
| 2016/0277510 A1 | 9/2016 | Du et al. |
| 2016/0379181 A1 | 12/2016 | Nordlof et al. |
| 2017/0200148 A1* | 7/2017 | Ulrich ................... H04L 67/131 |
| 2018/0121895 A1 | 5/2018 | Mohrlock et al. |
| 2018/0253726 A1 | 9/2018 | Kumnick et al. |
| 2019/0266584 A1 | 8/2019 | Walters et al. |
| 2020/0065857 A1* | 2/2020 | Lagi ................... G06Q 30/0254 |
| 2020/0356548 A1* | 11/2020 | Gujale .................. G06F 16/258 |
| 2021/0216976 A1 | 7/2021 | Kaufman et al. |

FOREIGN PATENT DOCUMENTS

| | | | |
|---|---|---|---|
| WO | 2012123727 A1 | 9/2012 | |
| WO | WO-2012174427 A2 * | 12/2012 | ............ G06Q 20/401 |
| WO | WO-2018144036 A1 * | 8/2018 | ............. G06F 30/20 |
| WO | 2019090312 A1 | 5/2019 | |
| WO | WO-2020081788 A1 * | 4/2020 | ........... G06Q 20/405 |

OTHER PUBLICATIONS

ISO8583 flows, field meaning and values (2017) (Year: 2017).*
"Acquirer Banks and Processors", Available online at: http://cleveris.com/payment-system-test/solutions/acquirer-bank-and-processors/, Accessed from Internet at Dec. 5, 2019, 6 pages.
"Coverage", Transaction Processing Guide, 2015.
"HIF Interface", ISO-8583, Message Format, 1987, pp. 1-24.
"ISO 8583 Flows, Fields Meaning and Values", ADMFactory, 2017, 9 pages.
"Testing in Production (TiP) for Payment Gateways", Inv Ref: 1870, Available online at: https://visa.anaqua.com/anaqua/Survey/SurveyPopup.aspx?id=f3e56e6b-3491-49f9-93ed-453fcc74a8fa, Accessed from Internet at Dec. 23, 2019, 2 pages.
"Transaction Processing Rules", Mastercard, Available Online at: https://www.mastercard.us/content/dam/mccom/en-US/documents/TPR-manual-June2015.pdf, Jun. 9, 2015, pp. 1-265.
"VisaNet Certification Management Service (VCMS) Testing Guide", Available Online at:https://insite.trusted.visa.com/content/dam/insite/work-resources/tech-reference/Tech%20Docs%20Library/documents/Q-Z/VisaNet-Certification-Management-Service-VCMS-Testing-Guide-BASE-II-Client-Version.pdf, Oct. 20, 2017, 156 pages.

* cited by examiner

PROTOTYPE MESSAGE SERVICE

CROSS-REFERENCE TO RELATED APPLICATIONS

This application is a continuation of U.S. application Ser. No. 16/702,139, filed Dec. 3, 2019, which is herein incorporated by reference in its entirety for all purposes.

BACKGROUND

With the growth of technology surrounding processing networks and risk assessment, barriers to entry are eroding and an increasing number of entities are establishing themselves as authorization providers. However, with this increase in authorization providers, resource providers that conduct transactions that require authorization are often unable to keep track of, or may not know in the first place, which types of transactions can be conducted by particular authorization providers. As the number of authorization providers continues to grow, these resource providers will continue to encounter authorization providers that they have not previously encountered, and will be unaware of what capabilities are available to those new authorization providers.

Embodiments of the disclosure address these and other problems, individually and collectively.

SUMMARY

Described herein are a system and techniques capable of determining an authorization provider's capabilities. More particularly, the system is able to assess an authorization provider's ability to conduct a particular type of transaction. In conventional systems, when a consumer attempts to conduct a transaction with a resource provider that involves a combination of transaction type and authorization provider that the resource provider has not previously encountered, in order to determine whether that combination is appropriate, the resource provider typically needs to obtain a number of details from the consumer. This can be both burdensome and time consuming for the resource provider as well as the consumer, which can be frustrating if the authorization provider is ultimately unable to conduct the transaction. The disclosed system provides the ability to assess whether an authorization provider is capable of performing a transaction type using a prototype messaging system while minimizing the upfront burden on the resource provider and consumer.

One embodiment of the disclosure is directed to a method performed by a service provider computer comprising maintaining a plurality of prototype message templates, each prototype message template associated with a different transaction type and comprising a number of data fields populated with default values, receiving, from an access device, a transaction request indicating a subset of transaction details and an indication of a transaction type, identifying an appropriate prototype message template of the plurality of prototype message templates based on the transaction type, generating a populated prototype message by overwriting a portion of the number of data fields of the identified prototype message template with the subset of transaction details, providing the populated prototype message to an authorization computer associated with the transaction request, and responding to the transaction request based on a response received from the authorization computer.

Another embodiment of the disclosure is directed to a service provider computer comprising: a processor; and a memory including instructions that, when executed with the processor, cause the service provider computer to, at least maintain a plurality of prototype message templates, each prototype message template associated with a different transaction type and comprising a number of data fields populated with default values, receive, from an access device, a transaction request indicating a subset of transaction details and an indication of a transaction type, identify an appropriate prototype message template of the plurality of prototype message templates based on the transaction type, generate a populated prototype message by overwriting a portion of the number of data fields of the identified prototype message template with the subset of transaction details, provide the populated prototype message to an authorization computer associated with the transaction request, and respond to the transaction request based on a response received from the authorization computer.

These and other embodiments of the disclosure are described in further detail below.

DETAILED DESCRIPTION

Figure 1:
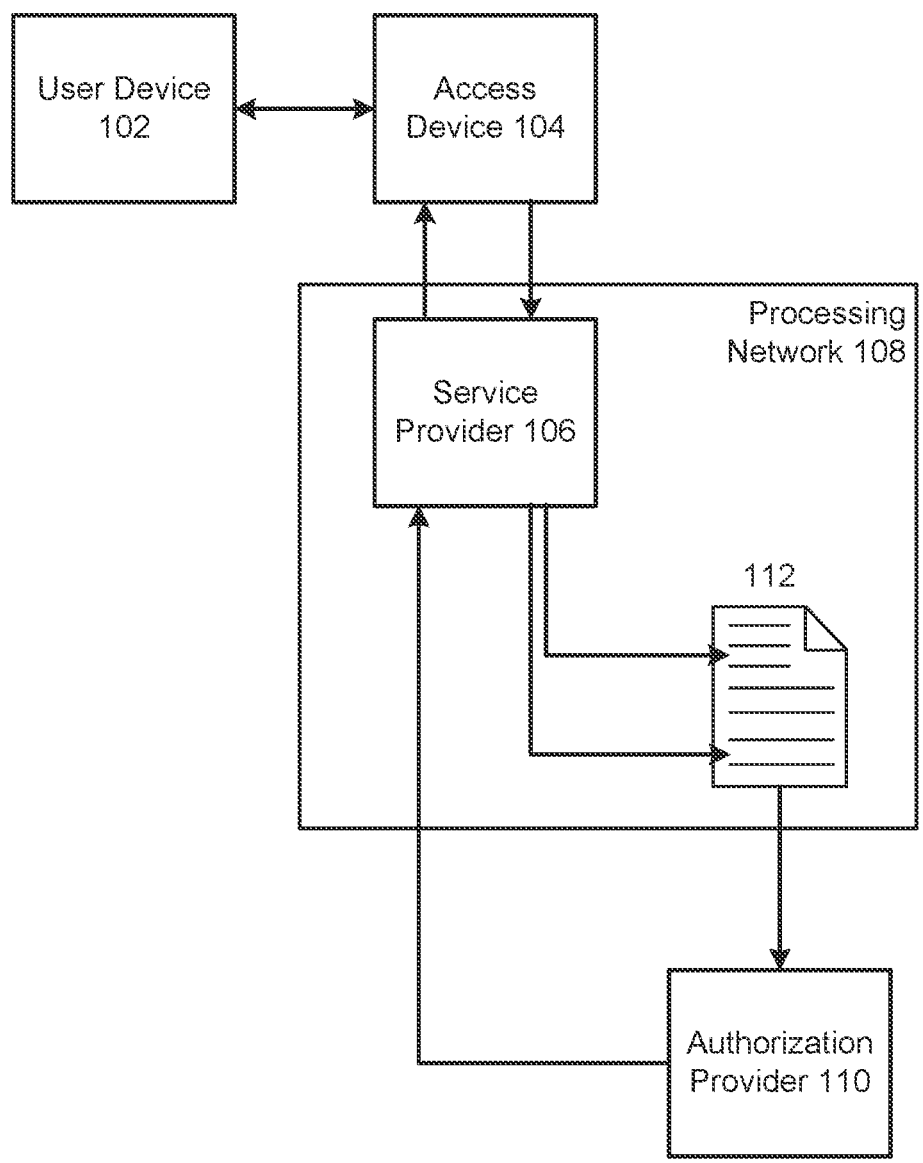
FIG. 1 depicts an illustrative overview of a system or architecture that may be implemented to determine authorization provider capabilities in accordance with embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the disclosure are directed to a system and techniques in which a service provider may determine one or more capabilities of an authorization provider. To do this, the service provider may, upon receiving a request to determine authorization provider capabilities that includes at least an account identifier and an indication of a transaction type, identify a prototype message template associated with the indicated transaction type from a plurality of prototype transaction templates. The service provider may then overwrite a number of default data values with data values specific to the transaction to generate a prototype message for the transaction, which it may then send to the authorization provider. Upon receiving a response from the authorization provider, the service provider may determine whether the authorization provider is capable of conducting a transaction of the indicated transaction type based on information included within the received response.

Prior to discussing the details of some embodiments of the present disclosure, description of some terms may be helpful in understanding the various embodiments.

"Authentication" may include a process for verifying an identity of something (e.g., a user). One form of authentication can be biometric authentication.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, resource provider identifier, resource provider location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the transaction processing computer) to the resource provider's access device (e.g., POS equipment) that indicates approval of the transaction. The code may serve as proof of authorization.

An "authorization provider" is an entity which can authorize or approve transactions. An authorization provider may typically refer to a business entity (e.g., a bank) that maintains an account for a user and is capable of authorizing transactions such as payment transactions, for example the purchase of goods or services. An authorization provider may provide a statement of the account to the user listing the transactions on the account. An authorization provider may enable a user to select a transaction on their statement to see a detailed digital receipt. The authorization provider may request the digital receipt from a processing server that provides an API for requesting digital receipts.

A "computing device" may be any suitable device that can receive and process data. Examples of computing devices may include access devices, transport computers, processing network computers, or authorization computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "prototype message" may be a message model. In some embodiments, a prototype message can be a message which includes a combination of specific and default data values that can be used to determine authorization provider capabilities. A prototype message may be in any suitable format and may be generated by overwriting a portion of default data values within a prototype message template with data values specific to a requested transaction. In some embodiments, a service provider may store a plurality of prototype message templates, with each of those prototype message templates being associated with a different transaction type and being populated completely with default values. By way of example, a prototype message template may include a "card acceptor city" data field which is initially populated with the data value "Foster City." During generation of a prototype message from the prototype message template, this data value may be overwritten by a data value that accurately reflects the city in which the card acceptor is registered. Some non-limiting examples of data fields that may be included within a prototype message template, and initially populated with a default value, may include "date," "card acceptor location," "merchant type," "point of service entry mode," "card acceptor ID code," "electronic commerce indicator," and "trace number."

A "resource" can be something that may be used or consumed by an entity or transferred between entities. A resource may also be something that is accessed by an entity. For example, the resource may be an electronic resource (e.g., stored data, received data, a computer account, a financial account, a network-based account, an email inbox), a physical resource (e.g., a tangible object, a building, a safe, or a physical location), or other electronic communications between computers (e.g., a communication signal corresponding to an account for performing a transaction).

A "server computer" may include a powerful computer or cluster of computers. For example, the server computer can be a large mainframe, a minicomputer cluster, or a group of servers functioning as a unit. In one example, the server computer may be a database server coupled to a Web server. A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

Details of some embodiments of the present disclosure will now be described in greater detail.

FIG. 1 depicts an illustrative overview of a system or architecture that may be implemented to determine authorization provider capabilities in accordance with embodiments of the disclosure. In FIG. 1, a user device 102 may be used to conduct a transaction with an access device 104. The access device may be in communication with a service provider 106, which may be part of a processing network 108 capable of routing authorization request messages to one or more authorization providers 110.

A user device 102 may be any device capable of communicating with an access device (e.g., to initiate a transaction). The user device 102 may provide the access device with data to be used in conducting a transaction (e.g., an account identifier, user information, etc.) as well as an indication of a type of transaction to be conducted. In some embodiments, the user device 102 may be capable of responding to a request for data received from an access device. For example, upon receiving a request for data from the access device, the user device 102 may retrieve the relevant data from its memory and provide that data to the access device automatically (e.g., without user interaction). In another example, upon receiving a request for data from the access device, the user device 102 may display a prompt to a user on a display screen and may obtain the requested data via user-provided input. The user device 102 may then provide this data to the access device via a response.

An access device 104 may be any electronic device capable of initiating a transaction for a resource managed by a resource provider. In some embodiments, an access device 104 may be a point of sale (POS) device operated by a merchant or other resource provider. The access device 104 may include any suitable means of communicating with a user device 102 to obtain data to be used in a transaction. For example, in some embodiments, the access device 104 may include a contactless reader capable of communicating with a contactless element installed upon the user device 102.

Processing network 108 may include a plurality of interconnected devices capable of routing authorization requests to an appropriate authorization provider 110. In some embodiments, a service provider 106 may be implemented on a device (e.g., a server) within the processing network 108. The service provider 106 may be capable of receiving a transaction request from an access device 104 and determining whether an appropriate authorization provider 110 is capable of performing the transaction indicated via the transaction request. In some embodiments, the service provider 106 may maintain access to a number of prototype messages 112, each prototype message being associated with a different type of transaction.

An authorization provider 110 may be any computing device operated on behalf of an authorization entity (e.g., an issuer) which is capable of determining whether to approve or decline a transaction indicated within an authorization request message.

By way of illustrating interactions between various components of the system, consider the following scenario. The access device 104 may receive a token or other account identifier to be used in the transaction from the user device 102. The access device 104 may not be able to readily discern whether an authorization provider 110 associated with the account identifier is able to perform the requested transaction. In order to make this determination, the access device 104 may transmit a request to a service provider 108, which may be part of processing network 108. It should be noted that the access device 104 may not be in possession of all of the information necessary to complete the transaction.

Upon receiving the request from the access device 104, the service provider may first determine a type of transaction at issue as well as an authorization entity associate with the account identifier. In some embodiments, the service provider 106 may maintain a database or other data store which indicates authorization providers and their respective known capabilities. The service provider 106 may, in some cases, first query this database to determine whether the authorization provider is capable of performing the type of transaction indicated in the request. However, if the service provider 106 is unable to determine whether the authorization provider 110 is able to perform the type of transaction, then the service provider 106 may perform a check operation as described below.

In the event that the service provider 106 is unable to determine whether an authorization provider 110 is able to perform a particular type of transaction, the service provider 106 may perform a check operation. Performing a check operation may first involve identifying a prototype message 112 associated with the type of transaction at issue. For example, the service provider 106 may have access to a plurality of prototype messages, where each prototype message is associated with a different type of transaction. In this example, the service provider 106 may retrieve the prototype message associated with the type of transaction indicated in the received request. Once the appropriate prototype message has been retrieved, the service provider may overwrite a number of data values in data fields of the prototype message with data values associated with the transaction (e.g., received from the access device 104 or stored in association with the access device 104). Once the data values of the prototype message have been overwritten, the prototype message may be transmitted to the authorization provider 110, which may determine whether to approve or decline a fictional transaction based on the prototype message. The authorization provider 110 may then provide a response to the service provider 106 indicating whether the fictional transaction would be approved or declined. It should be noted that the authorization provider 110 need not be provided any indication that the transaction is a fictional transaction, hence the authorization provider 110 need not be reconfigured to work with the system described herein.

Once the service provider 106 has received the response from the authorization provider 110, the service provider 106 may determine whether the authorization provider 110 is capable of performing the requested transaction based on that response. In some embodiments, the response may indicate an error or other indication of failure, which may indicate to the service provider 106 that the authorization provider 110 is incapable of performing the type of transaction at issue. In some embodiments, the service provider 106 may determine whether the authorization provider 110 is capable of performing the requested type of transaction based on whether the transaction is approved or declined via the response. In some cases, the service provider 106 may update an indication of the authorization provider's capabilities within a database upon making the determination.

Once the service provider 106 has determined whether the authorization provider 110 is capable of performing the requested transaction, the service provider 106 may provider a response to the access device 104 indicating whether or not the transaction may be performed. In some cases, the service provider 106 may provide an indication of one or more data fields that would be needed to complete the transaction. For example, the service provider 106 may identify any data fields within the prototype message 112 which were not populated during the check operation with data specific to the transaction (e.g., those that include default values). The set of identified data fields may then be provided to the access device 104, so that the access device 104 may request data values for those data fields from a user of the user device 102.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the internet), using any suitable communication protocol.

Figure 2:
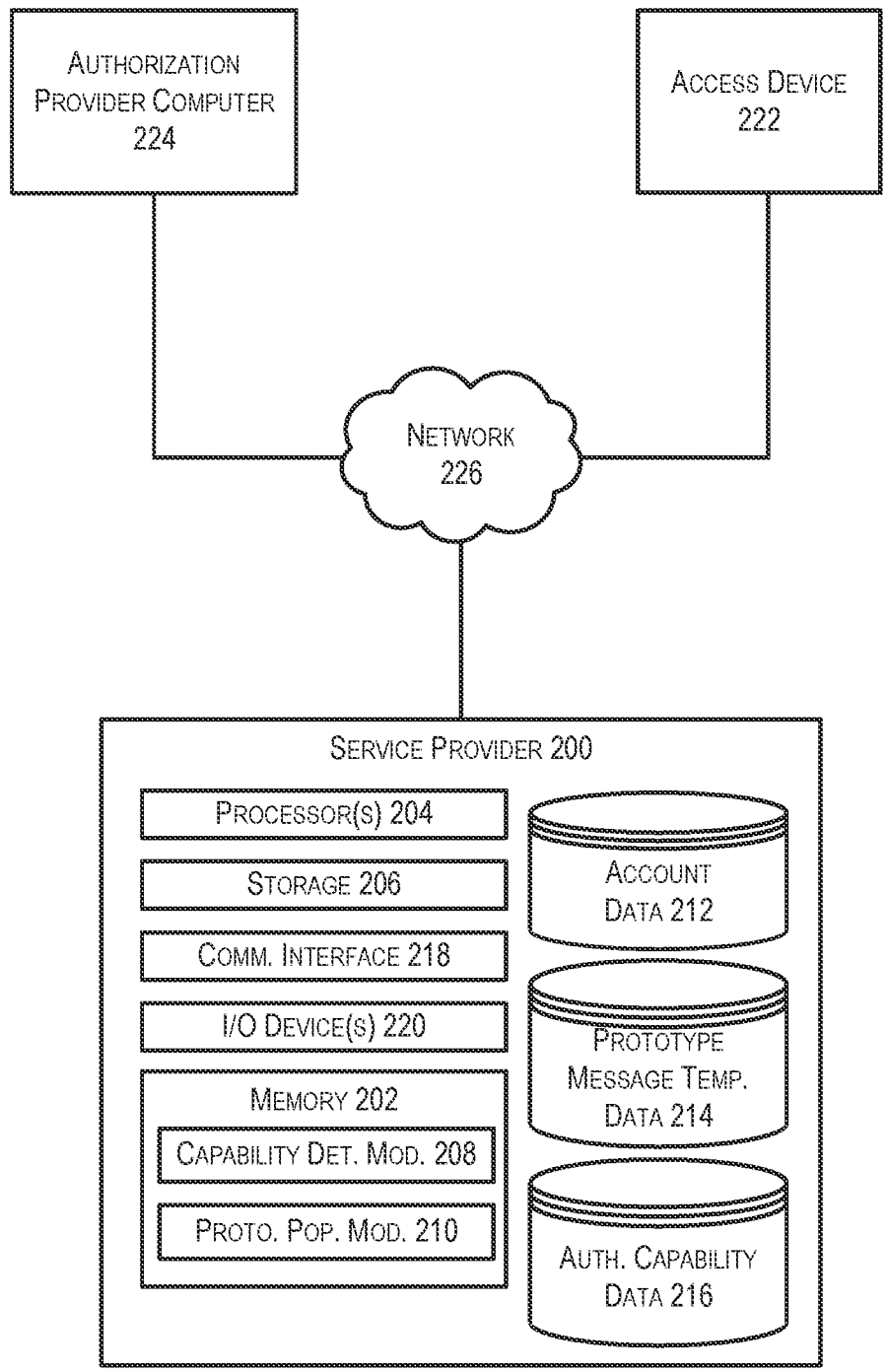
FIG. 2 depicts an illustrative example of a system or architecture in which techniques for enabling streamlined determination of authorization provider capabilities may be implemented.

FIG. 2 depicts an illustrative example of a system or architecture in which techniques for enabling streamlined determination of authorization provider capabilities may be implemented. In the depicted architecture, a service provider computer 200 may be in communication with at least one access device 222. The service provider 200 may further be in communication with at least one authorization provider computer 224. The service provider 200 may be in communication with the authorization provider computer 224 and/ or the access device 222 via a network 226. Service provider computer 200, access device 222, and authorization provider computer 224 may be respective examples of service provider computer 106, access device 104, and authorization provider computer 110 depicted in FIG. 1.

The service provider computer 200 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, one or both of the depicted computing devices may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider computer 200 may include at least one memory 202 and one or more processing units (or processors) 204. The processor (s) 204 may be implemented as appropriate in hardware, computer-executable instructions, firmware or combinations thereof. Computer-executable instruction or firmware implementations of the processor(s) 204 may include computer-executable or machine executable instructions written in any suitable programming language to perform the various functions described. The memory 202 may store program instructions that are loadable and executable on the processor(s) 204, as well as data generated during the execution of these programs. Depending on the configuration and type of service provider computer 200, the memory 202 may be volatile (such as random access memory (RAM)), non-volatile (such as read-only memory (ROM), flash memory, etc.), or some combination of the two. The service provider computer 200 may also include additional storage 206, such as either removable storage or non-removable storage including, but not limited to, magnetic storage, optical disks, and/or tape storage.

Turning to the contents of the memory 202 in more detail, the memory 202 may include an operating system and one or more application programs or services for implementing the features disclosed herein including at least a capability detection module 208 that, when executed by the processor 204, is configured to determine one or more capabilities of an authorization provider. In some embodiments, the memory 202 may also include a prototype message population module 210 that, when used in conjunction with the processor(s) 204, is configured to identify and populate an appropriate prototype message. The memory 202 may also include a number of data stores, including account data 212, which may maintain information related to a resource provider or consumer, prototype message template data 214, which maintains a mapping of prototype message templates to transaction types, and authorization capability data 216, which maintains information related to capabilities of (e.g., transaction types that may be performed by) various authorization providers.

In some embodiments, the capability detection module 208 may comprise code, executable by a processor to determine one or more capabilities of an authorization provider. To do this, the capability detection module 208 may perform some combination of processes which involve checking a database for known capabilities and transmitting a "prototype message" to the authorization provider. The capability detection module 208 may be instantiated upon receiving a request from an access device to perform a particular type of transaction with respect to an account identifier. In this scenario, the capability detection module 208 may be instantiated to determine whether an authorization provider associated with the account identifier is capable of performing the particular type of transaction. For example, the capability detection module 208 may first determine whether the service provider 200 already has information related to the authorization provider's ability to perform the requested transaction type. In this example, the capability detection module 208 may first query authorization capability data 216 to determine whether there is a recent record of the authorization provider being able to perform the requested transaction type. In some embodiments, the service provider 200 may maintain a record in authorization capability data 216 created when a response was received for a previous prototype message transmitted to the authorization provider. The capability detection module 208 may then determine whether that record is recent (e.g., the record was created or updated less than some threshold amount of time ago). If the record is determined to be recent, then the capability detection module 208 may return an indication as to whether the authorization provider has the capability to perform the transaction based on the retrieved record.

In the scenario in which the capability detection module 208 is unable to identify a recent record indicating a capability of the authorization provider to perform a particular type of transaction, the capability detection module 208 may perform a process in which a prototype message is populated and transmitted to the authorization provider. To do this, the capability detection module 208 may instantiate a prototype message population module 210 to generate a populated prototype message. The capability detection module 208 may then route the populated prototype message to the authorization provider computer 224, which may then provide a response to the populated prototype message which indicates whether the transaction can be performed. In some embodiments, at least a portion of the information from the received response may be stored by the service provider 200 for future reference (e.g., within authorization capability data 216). Upon receiving the response, the capability detection module 208 may determine whether the transaction can be performed and may, in turn, provide a response to the access device 222 indicating whether the transaction can be performed. In some embodiments, the service provider 200 may also provide an indication of additional information that may be needed from an owner of the account identifier to complete the transaction. For example, the service provider 200 may identify a number of data fields within the prototype message that would require population before such a transaction could be authorized. The access device 222 may then be caused to obtain data values for that number of data fields.

In some embodiments, the prototype message population module 210 may comprise code, executable by the processor(s) 204 to, upon receiving at least an indication of a type of transaction and an account identifier, generate a prototype message. In some embodiments, the service provider 200 may store a number of prototype messages in prototype message template data 214. Each prototype message stored in prototype message template data 214 may be associated with a different type of transaction and may include data fields specific to that type of transaction. Additionally, each data field in each prototype message may initially be populated with a default data value. Upon receiving an indication of a transaction type, the prototype message population module 210 may retrieve the prototype message template associated with the transaction type from prototype message template data 214.

Upon retrieval of the prototype message template associated with the transaction type from prototype message data 214, the prototype message population module 210 may overwrite default data values in one or more data fields of that prototype message template. This may involve overwriting at least an account identifier data field with the account identifier received via the request. In some embodiments, the prototype message population module 210 may also receive a number of additional data values via the request that the prototype message population module 210 may populate to respective data fields. In some embodiments, the service provider 200 may identify data values stored in relation to at least one of a resource provider associated with the access device or a user associated with the account identifier and the prototype message population module 210 may overwrite respective data fields within the prototype message with those data values.

The service provider computer 200 may also contain communications interface(s) 218 that enable the service provider computer 200 to communicate with a stored database, another computing device or server, one or more remote devices, and/or any other suitable electronic devices. In some embodiments, the communication interface 218 may enable the service provider computer 200 to communicate with other electronic devices on a network 226 (e.g., on a private network). The service provider computer 200 may also include input/output (I/O) device(s) and/or ports 220, such as for enabling connection with a keyboard, a mouse, a pen, a voice input device, a touch input device, a display, speakers, a printer, etc. In some embodiments, the service provider computer 200 may be in communication with a access device 222 and/or an authorization provider computer 224 via the network 226.

In some embodiments, the network 226 may include any one or a combination of many different types of networks, such as cable networks, the Internet, wireless networks, cellular networks, and other private and/or public networks. In some embodiments, the network 226 may be a payment processing network (e.g., VisaNet) which is capable of routing authorization request messages to an appropriate authorization provider. While the illustrated example depicts various electronic devices accessing the service provider computer 200 over the network 226, the described techniques may equally apply in instances where the electronic devices interact with the service provider computer 200 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The access device 222 may be any suitable type of computing device capable of processing a request to complete a transaction. The access device 222 may include a memory and one or more processors capable of processing computer executable instructions. The access device 222 may also be associated with a resource provider, such as a merchant or other provider of goods and/or services.

The authorization provider computer 224 may be any suitable type of computing device capable of determining whether to approve or decline a transaction associated with an account that it maintains. In some cases, the authorization provider computer 224 may be operated by, or on behalf of, an authorization provider (e.g., an issuer).

Figure 3:
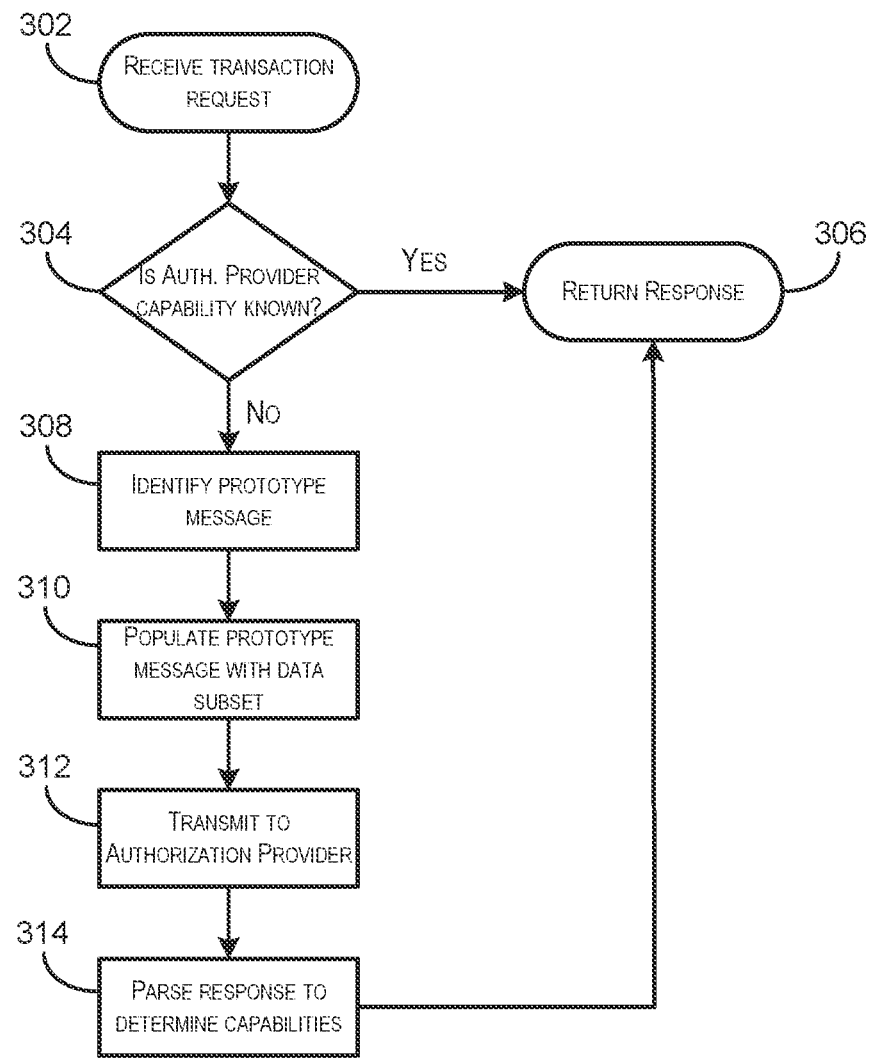
FIG. 3 depicts an illustrative flow chart demonstrating an example process for determining authorization provider capabilities in accordance with at least some embodiments.

FIG. 3 depicts an illustrative flow chart demonstrating an example process for determining authorization provider capabilities in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the service provider 200 described in relation to FIG. 2. The code may be stored on a computer-readable storage medium, for example, in the form of a computer program including a plurality of instructions executable by one or more processors. The computer-readable storage medium may be non-transitory.

Process 300 may begin at 302, when a request is received by the service provider to determine capabilities of an authorization provider for a particular transaction. The request would include at least an account identifier and a transaction type, which identifies an account maintained by a particular authorization provider. The process 300 may further involve identifying one or more of a user associated with the account identifier and the authorization provider associated with the account identifier. The process 300 may further involve identifying one or more data values associated with the user and/or the authorization provider.

At 304, the process 300 may involve determining whether a status of the requested capability is already known for the authorization provider determined to be associated with the request. This may involve querying a database of known authorization provider capabilities in order to determine whether the determined authorization provider is capable of performing the requested transaction type. If the service provider identifies a data entry via the above query, the service provider may further determine whether that data entry is current (e.g., last updated within some predetermined period of time). If the data entry is not current, the service provider may determine that the authorization provider capability is not known even though the data entry was retrieved. If the data entry is current, then the service provider may return a response that includes an indication as to whether the authorization provider is capable of performing the requested transaction as illustrated at 306.

At 308, the process 300, upon determining that the capabilities of the authorization provider with respect to the requested transaction type are not known, may involve identifying a prototype message associated with the transaction type. In some embodiments, the service provider may store a plurality of prototype messages within a memory, wherein each prototype message of the plurality of prototype messages is associated with a different transaction type. In these embodiments, an appropriate prototype message may be selected based on the transaction type.

At 310, the process 300 may involve populating the identified prototype message with a subset of data values. In some embodiments, at least a portion of the subset of data values may be received in the transaction request at 302. In some embodiments, at least a portion of the subset of data values may be retrieved from a database by virtue of its association with one or more of a user associated with the account identifier or the authorization provider associated with the account identifier. Each of the data values in the subset of data values may be populated into the prototype message by identifying an appropriate data field for each data value and overwriting a current or default data value within that appropriate data field with the data value of the subset of data values.

At 312, the process 300 may involve transmitting the populated prototype message to the identified authorization provider. In some embodiments, this may involve transmitting the prototype message to an authorization provider computer via a payment processing network. Once transmitted, the service provider may receive a response to the prototype message from the authorization provider.

At 314, the process 300 may involve parsing a response received from the authorization provider computer to determine a capability of the authorization provider with respect to the requested transaction. In some embodiments, the service provider may determine that the authorization provider is capable of conducting the transaction type if the received response indicates an approval of the transaction. In some embodiments, the service provider may determine that the authorization provider is incapable of conducting the requested transaction upon detecting that the response includes either a decline of the transaction or an error message. The determination regarding whether the authorization provider is or is not capable of conducting the requested transaction may then be provided in response to the received transaction request at 306.

Figure 4:
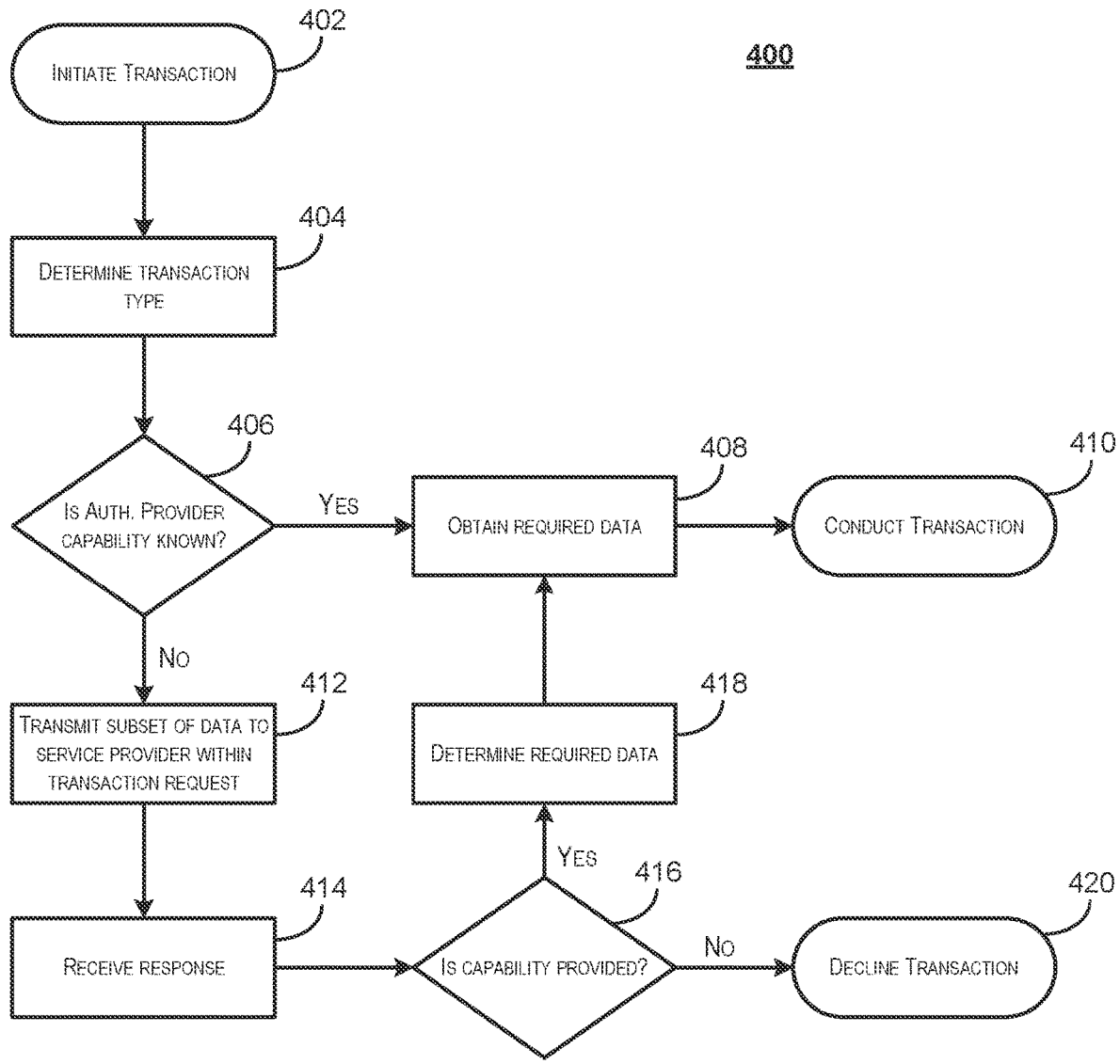
FIG. 4 depicts an illustrative flow chart demonstrating an example process for conducting a transaction having unknown authorization provider capabilities in accordance with at least some embodiments.

FIG. 4 depicts an illustrative flow chart demonstrating an example process for conducting a transaction having unknown authorization provider capabilities in accordance with at least some embodiments. In accordance with at least one embodiment, the process 400 of FIG. 4 may be performed by at least the access device 222 described in relation to FIG. 2.

Process 400 may begin at 402, when a transaction is initiated with the access device. In this example, a user may present a payment device or other account identifier to the access device to be used in completing the transaction. The process may further involve determining a transaction type to be associated with the initiated transaction at 404. For example, a particular type of transaction may be selected to be conducted either by a user or automatically (without user interaction) based on a context of the transaction. By way of a first example, a user may select to perform either a debit or credit transaction. As a second example, the user may select to perform a cash-back transaction. Additionally, the access device may determine an authorization provider to be associated with the transaction. This may be done based on the account identifier. For example, the access device may determine the authorization provider associated with the account identifier based on a banking identification number (BIN) included in the first six digits of the account identifier.

At 406, the process 400 may involve determining, by the access device, whether the authorization provider is known to be capable of conducting the requested transaction type. In some embodiments, this may involve accessing a database (e.g., either a local database or a database maintained by an operator of the access device) of authorization provider capabilities. For example, the access device (or another entity in communication with the access device) may maintain a database indicating past transactions conducted with various authorization providers. If the access device has conducted a transaction of the transaction type with the authorization provider before, and hence the access device is able to determine that the authorization provider is capable of conducting the requested transaction, then the process 400 may further involve obtaining any information required to complete the transaction at 408. For example, upon determining that the authorization provider is capable of conducting the transaction at issue, the access device may further identify a number of data values that need to be provided to the authorization provider in order to complete the transaction. In this example, the access device may prompt a consumer to provide those data values. Once the required data values have been obtained by the access device, those data values may be used to conduct the requested transaction at 410. For example, the access device (or another computing device operating on its behalf) may generate an authorization request message that includes the obtained data values, which may then be transmitted to the authorization provider via a payment processing network.

At 412, the process 400 may involve determining that an authorization provider's ability to conduct a requested transaction type is unknown. In this scenario, the access device may transmit a transaction request to a service provider. The service provider, upon receiving the request, may perform the process 300 described with respect to FIG. 3 above.

At 414, the process 400 may involve receiving, at the access device, a response to the transaction request from the service provider. The response may include an indication of whether the authorization provider is capable of conducting the requested transaction type. In some embodiments, the service provider may provide, along with an indication that the authorization provider is capable of conducting the requested transaction type, a set of data values required for such a transaction.

At 416, the process 400 may involve determining, based on the received response, whether the authorization provider is capable of conducting the requested transaction. If the authorization provider is determined to be capable of conducting the transaction, then the access device may further determine what data values are required for such a transaction at 418. In some cases, the required data values may be indicated within the response received from the service provider. In some embodiments, the access device may identify a number of data values required for a particular transaction type regardless of the authorization provider. Once the required data values have been identified, the process 400 may obtain those data values at 408. If the response indicates that the authorization provider is not capable of conducting the requested transaction type, then the requested transaction may be declined at 420.

Figure 5:
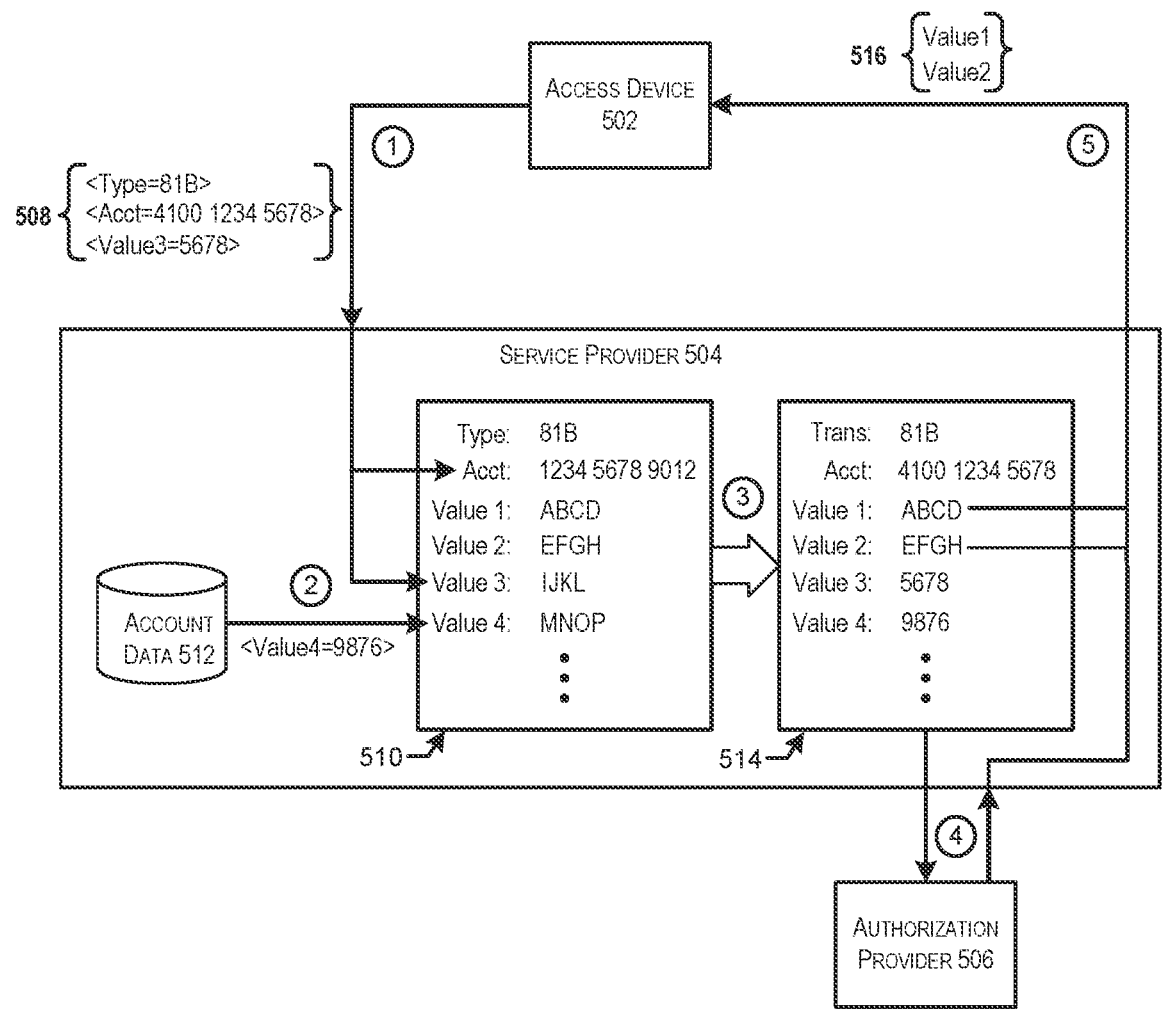
FIG. 5 depicts an illustrative example of a process for generating and using prototype messages in accordance with at least some embodiments.

FIG. 5 depicts an illustrative example of a process for generating and using prototype messages in accordance with at least some embodiments. In particular, FIG. 5 depicts various interactions between an access device 502, a service provider 504, and an authorization provider computer 506. Each of access device 502, service provider 504, and authorization provider computer 506 may be respective examples of access device 222, service provider computer 200, and authorization provider computer 224.

At step 1 of process 500, an access device 502 may transmit a request to the service provider computer 504 to determine one or more capabilities of an authorization provider 506. For example, the access device 502 may receive a request to conduct a particular type of transaction with respect to a received account identifier associated with the authorization provider and may need to determine if the authorization provider is capable of conducting the requested transaction type. In the request, the access device 502 may provide a number of data values 508 to be used in determining whether the authorization provider includes the capability at issue.

Upon receiving the request including the data values 508, the service provider 504 may identify an appropriate prototype message template 510. The prototype message template 510 may be selected based on its relevance to a transaction type associated with a the request, which may be indicated within data values 508. For example, the service provider 504 may store a plurality of prototype message templates, with each unique prototype message template of the plurality being associated with a particular type of transaction. In some embodiments, the data values 508 may, at a minimum, include a transaction type and an account identifier. The identified prototype message template may include a number of data fields, each of which are initially populated with a generic or default data value.

At step 2 of the process 500, the service provider 504 may identify, from the data values 508 as well as from account data 512, a number of data values to be populated into the prototype message template 510. In some embodiments, this may involve identifying each of the data fields in the prototype message template 510 and determining whether the service provider 504 has access to a data value to be provided within that data field. In some embodiments, the service provider 504 may identify a combination of data values from the data values 508 and the account data 512 which can be used to populate data fields of the prototype message template 510.

At step 3 of the process 500, the service provider 504 may populate the prototype message template 510 with the identified data values to generate a prototype message 514. To do this, the service provider 504 may identify and overwrite a number of data fields associated with the retrieved data values.

At step 4 of the process 500, the service provider may transmit the prototype message 514 to the authorization provider 506. In some embodiments, this may involve transmitting the populated prototype message 514 to a payment processing network to be routed to the authorization provider 506. The authorization provider 506 may then provide a response to receiving the prototype message 514. It should be noted that the authorization provider 506 need not be an active participant in the system described herein. For example, the authorization provider computer 506 need not be modified to interact with the system described herein.

The service provider 504 may receive a response from the authorization provider computer 506. The service provider 504 may determine, based on the received response, whether the authorization provider computer 506 is capable of conducting the requested transaction type. To do this, the service provider 504 may parse the received response to identify an approval, a decline, or an error. In some cases, the approval may indicate that the authorization provider 506 is capable of conducting the transaction with respect to the received account identifier. In contrast, a decline or error may indicate that the authorization provider computer 506 is not capable of conducting the transaction type at least with respect to the account identifier at issue.

At step 5 of the process 500, the service provider 504 may provide a response to the access device regarding the capabilities of the authorization provider computer 506. In some embodiments, the response may include only an indication as to whether or not the authorization provider is capable of conducting the requested transaction. In some embodiments, the response may also indicate data that needs to be collected by the access device in order to conduct the transaction type. For example, the service provider 504 may identify a set of data fields within the prototype message 514 which have not been overwritten with a data value at step 3. This may indicate a data field which includes a data value necessary to complete the transaction, but for which the service provider 504 is unable to provide a corresponding data value. A list of the data fields 516 may then be provided to the access device along with an indication that the authorization provider 506 is capable of conducting the transaction type. The access device 502 may then be configured to obtain data values for the data fields in the list of data fields 516 and initiate the transaction.

Figure 6:
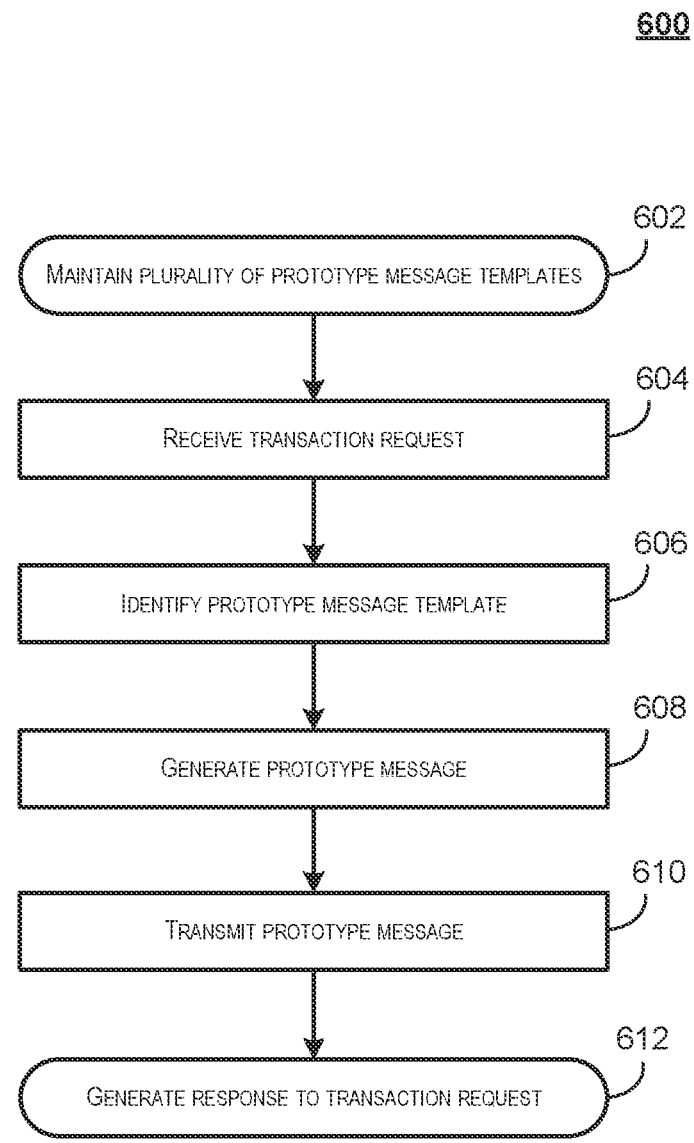
FIG. 6 depicts an illustrative flow diagram depicting a process for receiving and responding to a request for transaction capability in accordance with at least some embodiments.

FIG. 6 depicts an illustrative flow diagram depicting a process for receiving and responding to a request for transaction capability in accordance with at least some embodiments. The process 600 may be performed by a service provider computer, such as the service provider computer 200 described with respect to FIG. 2 above.

At 602, the process 600 may involve the service provider storing and maintaining a number of prototype message templates, with each prototype message template is associated with a different transaction type.

At 604, the process 600 may involve receiving a transaction request which indicates a type of transaction to be conducted and a subset of details. The subset of transaction details may include at least an account identifier. The transaction request may be received from an access device, which may be operated on behalf of a resource provider.

At 606, the process 600 may involve identifying an appropriate prototype message template. This may involve identifying a prototype message template of the number of prototype message templates which is associated with the transaction type.

At 608, the process 600 may involve generating a prototype message. This may further involve overwriting a portion of the number of data fields of the identified prototype message template with at least a portion of the subset of transaction details. In some embodiments, this may further involve overwriting a second portion of the number of data fields of the identified prototype message template with data values related to the resource provider.

At 610, the process 600 may involve the service provider transmitting the generated prototype message to the authorization provider. The service provider may then receive a response from the authorization provider. It should be noted that the populated prototype message represents a fictional transaction. However, the authorization computer is caused to respond to the populated prototype message as if it were a real transaction.

At 612, the process 600 may involve generating and transmitting a response to the transaction request. This may further involve determining, based on information included within the response received from the authorization computer, whether the authorization computer is capable of conducting a transaction of the transaction type. For example, the authorization computer may be determined to be capable of conducting the transaction of the transaction type upon determining that the response received from the authorization computer includes an approval. In a second example, the authorization computer may be determined not to be capable of conducting the transaction of the transaction type upon determining that the response received from the authorization computer includes a decline or an error. In some embodiments, the response may further include an indication of one or more data fields required to conduct a transaction of the transaction type. For example, the service provider may determine one or more data fields as being data fields of the number of data fields which include default data within the prototype message.

Embodiments of the disclosure provide for a number of advantages over conventional systems. For example, in conventional systems, if a resource provider wishes to determine whether a particular type of transaction can be conducted using a specified account (and authorization provider), that resource provider would typically need to conduct the transaction and see if it goes through. This would involve collecting all of the required user's data, compiling it into the appropriate format, and routing it to the authorization provider through a payment processing network, which is both time consuming and burdensome. The disclosed system solves these problems with conventional systems by providing the resource provider with the ability to check whether a particular type of transaction can be conducted using a specified account by simply providing the account number and the type of transaction, which is advantageous over, and more efficient than, conventional systems. Furthermore, the system operates in a way which does not require any modifications to be made to, or even active participation by, legacy authorization provider architectures.

It should be understood that any of the embodiments of the present disclosure can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by an access device, a transaction request including an account identifier that is to be used for a transaction;
   determining, by the access device, a type of the transaction and an authorization computer associated with the transaction;

determining, by the access device, whether the authorization computer associated with the transaction is capable of conducting the type of the transaction;
responsive to an unsuccessful determination, transmitting, by the access device, a request including a subset of transaction details comprising the account identifier and the type of the transaction to a service provider computer, wherein the service provider computer is configured to:
identify an appropriate prototype message template of a plurality of prototype message templates based on the type of the transaction, the appropriate prototype message template being populated with default data values in data fields, wherein each prototype message template of the plurality of prototype message templates is unique;
retrieve from an account information database associated with the access device, first information associated with the account identifier included within the subset of transaction details and second information associated with the access device;
generate a populated prototype message by: (1) overwriting a first portion of data fields and a corresponding default data values in the appropriate prototype message template with the subset of transaction details comprising the account identifier, and (2) overwriting a second portion of the data fields to include the first information and the second information, wherein the populated prototype message is transmitted by the service provider computer to the authorization computer and represents a test transaction that is different from the transaction; and
responsive to receiving a response message from the authorization computer, (i) parse the response message to determine whether the authorization computer is capable of conducting the transaction request, and (ii) transmit to the access device, a transaction indicator indicating whether the authorization computer is capable of conducting the transaction and an identification of additional data fields needed to process the type of the transaction;
responsive to receiving the transaction indicator, obtaining, by the access device, input associated with additional data values for additional data fields needed to process the type of the transaction;
in response to receiving the transaction indicator and input corresponding to the additional data fields obtained from a user device, generating by the access device, an authorization request message comprising the account identifier and additional data fields comprising additional data values;
transmitting, by the access device, the authorization request message to the service provider computer; and
responsive to receiving an authorization response message from the service provider computer, processing, by the access device the transaction request.

2. The method of claim 1, wherein the type of the transaction is a debit transaction, a credit transaction, or a cash-back transaction.

3. The method of claim 1, wherein the access device determines the authorization computer associated with the transaction based on a banking identification number included in the account identifier.

4. The method of claim 1, wherein each prototype message template of the plurality of prototype message templates corresponds to a particular type of transaction.

5. The method of claim 1, wherein the populated prototype message represents the test transaction that is different from the request, and wherein the authorization computer configured to respond to the populated prototype message as a non-test transaction.

6. The method of claim 1, wherein the authorization computer is determined to be capable of conducting the type of the transaction upon determining that the response message received from the authorization computer includes an approval.

7. The method of claim 1, wherein the account identifier is a credit card number.

8. The method of claim 1, wherein the access device is a POS terminal.

9. The method of claim 1, wherein the access device is operated on behalf of a resource provider.

10. The method of claim 1, wherein the authorization computer is an issuer computer.

11. An access device comprising:
a processor; and
a memory including instructions that, when executed with the processor, cause the access device to, at least:
receive a transaction request including an account identifier that is to be used for a transaction;
determine a type of the transaction and an authorization computer associated with the transaction;
determine whether the authorization computer associated with the transaction is capable of conducting the type of the transaction;
responsive to an unsuccessful determination, transmit a request including a subset of transaction details comprising the account identifier and the type of the transaction to a service provider computer, wherein the service provider computer is configured to:
identify an appropriate prototype message template of a plurality of prototype message templates based on the type of the transaction, the appropriate prototype message template being populated with default data values in data fields, wherein each prototype message template of the plurality of prototype message templates is unique;
retrieve from an account information database associated with the access device, first information associated with the account identifier included within the subset of transaction details and second information associated with the access device;
generate a populated prototype message by: (1) overwriting a first portion of data fields and a corresponding default data values in the appropriate prototype message template with the subset of transaction details comprising the account identifier, and (2) overwriting a second portion of the data fields to include the first information and the second information, wherein the populated prototype message is transmitted by the service provider computer to the authorization computer and represents a test transaction that is different from the transaction; and
responsive to receiving a response message from the authorization computer, (i) parse the response message to determine whether the authorization computer is capable of conducting the transaction request, and (ii) transmit to the access device, a transaction indicator indicating whether the authorization computer is capable of conducting the transaction and an identification of additional data fields needed to process the type of the transaction;

responsive to receiving the transaction indicator, obtaining, by the access device, input associated with additional data values for additional data fields needed to process the type of the transaction;

in response to receiving the transaction indicator and input corresponding to the additional data fields obtained from a user device, generate an authorization request message comprising the account identifier and additional data fields comprising additional data values;

transmit the authorization request message to the service provider computer; and responsive to receiving an authorization response message from the service provider computer, process the transaction request.

12. The access device of claim 11, wherein the type of the transaction is a debit transaction, a credit transaction, or a cash-back transaction.

13. The access device of claim 11, wherein the access device determines the authorization computer associated with the transaction based on a banking identification number included in the account identifier.

14. The access device of claim 11, wherein each prototype message template of the plurality of prototype message templates corresponds to a particular type of transaction.

15. The access device of claim 11, wherein the populated prototype message represents the test transaction that is different from the request, and wherein the authorization computer configured to respond to the populated prototype message as a non-test transaction.

16. The access device of claim 11, wherein the authorization computer is determined to be capable of conducting the type of the transaction upon determining that the response message received from the authorization computer includes an approval.

17. The access device of claim 11, wherein the account identifier is a credit card number.

18. The access device of claim 11, wherein the access device is a POS terminal.

19. The access device of claim 11, wherein the access device is operated on behalf of a resource provider.

20. The access device of claim 11, wherein the authorization computer is an issuer computer.

* * * * *